A. THOMPSON AND J. ATKINSON.
SHOVEL.
APPLICATION FILED APR. 1, 1921.

1,407,237.

Patented Feb. 21, 1922.

A. Thompson and J. Atkinson
INVENTORS.

BY Victor J. Evans
ATTORNEY

UNITED STATES PATENT OFFICE.

ABEL THOMPSON AND JESSE ATKINSON, OF ROLAND, IOWA.

SHOVEL.

1,407,237.

Specification of Letters Patent.  Patented Feb. 21, 1922.

Application filed April 1, 1921. Serial No. 457,766.

*To all whom it may concern:*

Be it known that we, ABEL THOMPSON and JESSE ATKINSON, citizens of the United States, residing at Roland, in the county of Story and State of Iowa, have invented new and useful Improvements in Shovels, of which the following is a specification.

This invention relates to shovels and an object of the invention is to provide a collapsible shovel designed principally for use by motorists, which may be folded into a relative compact structure and be carried about as part of the tool kit of the vehicle.

Considerable difficulty and frequently expense is entailed because of the failure of a motorist to have a shovel convenient when his vehicle becomes stalled at a remote place on a roadway and it is often necessary to go a considerable distance to get a shovel to dig the vehicle out or wait until a second motorist comes along and offers towing assistance and there are also several other uses for a shovel when it is inconvenient to carry an ordinary shovel with a rigid handle, and it is therefore, an object of this invention to provide a shovel wherein the handle is composed of a plurality of hingedly connected sections which may be folded into a compact structure and locked therein to prevent relative vibratory movement of the parts, and one which also embodies means for securely locking the handle sections in longitudinally aligning handle forming position.

Other objects of the invention will appear in the following detailed description and in the accompanying drawing wherein.

Figure 1:
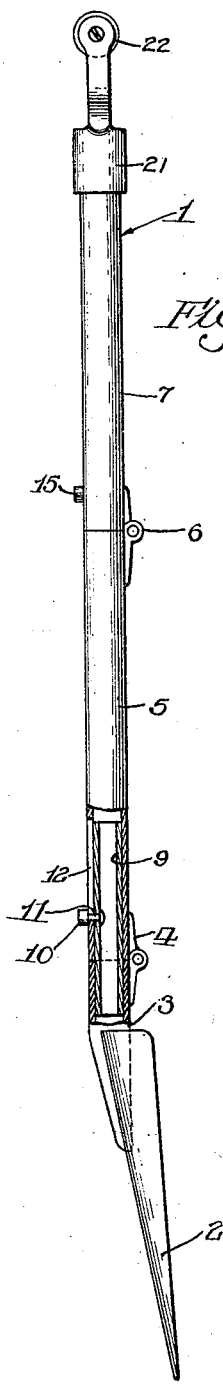
Fig. 1 is a side elevation of the improved shovel.
Figure 2:
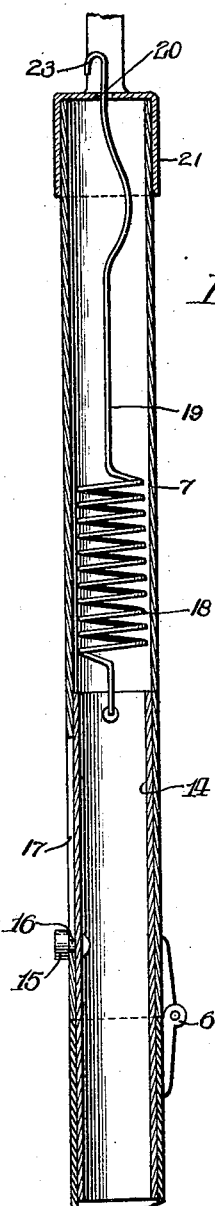
Fig. 2 is an enlarged longitudinal section through the handle of the shovel.
Figure 3:
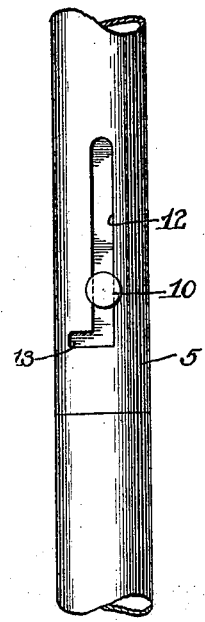
Fig. 3 is an enlarged rear elevation of the handle of the shovel.
Figure 4:
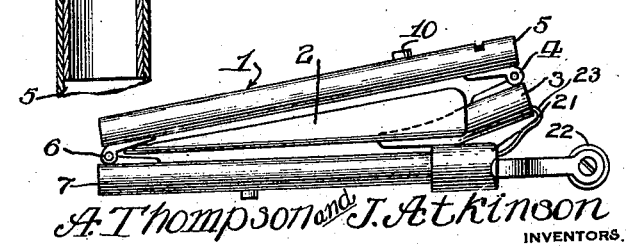
Fig. 4 is a side elevation of the shovel showing it collapsed.

Referring more particularly to the drawing the improved shovel comprises the handle structure 1 and the blade 2 which blade is of the usual shape and construction of shovel blades and has a socket 3 rigidly attached thereto in the usual manner. The socket 3 is longitudinally connected, by means of a hinge 4, with the section 5 of the handle structure 1 so as to permit the shovel blade 2 to be folded along side the handle section 5 as shown in Fig. 4 of the drawing when it is desired to collapse the shovel structure. The handle section 5 is connected, by the hinge 6, to the handle section 7 and the hinge 6 is disposed to permit the handle section 7 to be folded along side the blade 2 at the opposite side of the blade from the handle section 5 thereby permitting the shovel to be collapsed into a compact structure for storing or transporting same. The section 5 and socket 3 are locked against hinged or pivotal movement and in alignment with each other by a locking sleeve 9 which is telescopically carried by the section 5 and is adapted to be moved into the upper hollow end of the socket 3. A button 10 is attached to the locking sleeve 9 and its stem 11 rides in a vertical slot 12 during the sliding movement of the locking sleeve. The lateral extension 13 is formed on the lower end of the slot 12 and when the locking sleeve is inserted in the socket 3 and the stem 11 aligns with the lateral extension 13 the sleeve is slightly rotated by means of the button 10, which moves the stem 11 into the lateral extention 13, which prevents longitudinal or giving movement of the locking sleeve 9 when pressure is applied to the shovel and also prevents accidental locking movement of the sleeve 9.

The second locking sleeve 14 is provided for locking the sections 7 and 5 against relative hinged movement and the sleeve 14 carries a button 15 having a stem 16 which rides in a slot 17 similar to the slot 12 and which is held against accidental movement into a lateral extension at the lower end of the slot 17. A spiral spring 18 is connected to the upper end of the sleeve 14 and its upper terminal is extended to form a rod 19 which projects through an opening 20 in the ferrule 21 of the hand grip 22. The end of the rod 19, which projects through the ferrule 20, has a hook 23 formed thereon which is adapted to engage in the open end of the socket 3 when the shovel is in its folded or collapsed position as shown in Fig. 4 of the drawing to lock the respective sections of the shovel folded against accidental relative movement.

Upon release of the hook 23 from the socket 3 the spring 18 will contract and draw the rod 19 into the socket. The hand grip structure 22 may be of any approved structure and is attached to the upper shovel handle section 7 by the ferrule 21 in the usual manner.

From the foregoing description taken in connection with the accompanying drawing it will be apparent that a shovel has been provided which is particularly adapted for use by motorists, surveyors or their assistants, campers, and many other persons who have use for a shovel which can be carried about.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a shovel, a blade, a handle composed of a plurality of hingedly connected sections, a socket formed upon said blade, one of said handle sections being hingedly connected to said socket, means for locking said handle sections in longitudinal aligning position, and means for locking said handle sections and blade in folded position.

2. In a shovel, a blade, a socket formed thereon, a handle structure composed of a plurality of hingedly connected sections, one of said sections being hingedly connected to said socket, locking sleeves carried by said sections and adapted to bridge the meeting hinged ends of the sections to lock them in aligned position against accidental hinged movement, and means for preventing accidental hinged movement of said locking sleeves.

3. In a shovel, a blade, a socket formed thereon, a handle structure composed of a plurality of hingedly connected sections, one of said sections being hingedly connected to said socket, locking sleeves carried by said sections and adapted to bridge the meeting hinged ends of the sections to lock them in aligned position against accidental hinged movement, means for preventing accidental hinged movement of said locking sleeves, a spring in one of said handle sections and having a hook extension thereon, said hook extension adapted to engage in said socket to lock the handle sections and blade in folded position.

4. In a shovel, a blade, a handle structure hingedly connected to said blade and comprising a plurality of hingedly connected sections, means for locking said handle sections against accidental longitudinal movement, means for preventing accidental movement of said locking means, and means for locking said handle sections and blade in folded position.

In testimony whereof we affix our signatures.

ABEL THOMPSON.
JESSE ATKINSON